US007169210B2

(12) United States Patent
Baksh et al.

(10) Patent No.: US 7,169,210 B2
(45) Date of Patent: Jan. 30, 2007

(54) CONTROL SYSTEM FOR HELIUM RECOVERY (75) Inventors: Mohamed Safdar Allie Baksh, Wheatfield, NY (US); Scot Eric Jaynes, Lockport, NY (US); Bernard Thomas Neu, Lancaster, NY (US); James Smolarek, Boston, NY (US); Mark Thomas Emley, Boston, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/485,219

(22) PCT Filed: Jul. 31, 2002

(86) PCT No.: PCT/US02/24136

§ 371 (c)(1),
(2), (4) Date: Jun. 23, 2004

(87) PCT Pub. No.: WO03/011434

PCT Pub. Date: Feb. 13, 2003

(65) Prior Publication Data

US 2004/0216609 A1 Nov. 4, 2004

Related U.S. Application Data

(60) Provisional application No. 60/309,073, filed on Jul. 31, 2001.

(51) Int. Cl.
*B01D 53/047* (2006.01)
*B01D 53/22* (2006.01)

(52) U.S. Cl. .................. 95/11; 95/53; 95/96; 96/4; 96/111; 96/134; 96/408
(58) Field of Classification Search .............. 96/4, 96/111, 133, 134, 135, 400, 408; 95/8, 11, 95/12, 45, 53, 96, 106, 148
See application file for complete search history.

(56) References Cited

U.S. PATENT DOCUMENTS

| 4,238,204 | A | | 12/1980 | Perry ........................ 55/16 |
| 4,690,695 | A | * | 9/1987 | Doshi ........................ 95/55 |
| 4,717,407 | A | * | 1/1988 | Choe et al. ................ 62/624 |
| 5,004,482 | A | | 4/1991 | Haas et al. ................. 55/16 |
| 5,077,029 | A | | 12/1991 | Schaub .................... 423/351 |
| 5,207,806 | A | * | 5/1993 | Lagree et al. ................ 95/8 |
| 5,224,350 | A | * | 7/1993 | Mehra ...................... 62/624 |

(Continued)

FOREIGN PATENT DOCUMENTS

EP   0820963 B1   9/1999

(Continued)

*Primary Examiner*—Frank M. Lawrence
(74) *Attorney, Agent, or Firm*—Flora W. Feng (57) ABSTRACT

The present invention relates to a gas recycling system that includes a) a source of gas having a predetermined purity; b) an application system that uses the gas and adds contaminants to the gas; c) an adsorption system for removing the contaminants from the gas to produce a purified gas and a waste gas; d) a gas purity analyzer for measuring the amount of the contaminants in the waste gas; and e) conduits connecting the gas source to the application system, and the application system to the adsorption system.

17 Claims, 4 Drawing Sheets

U.S. PATENT DOCUMENTS

| | | | |
|---|---|---|---|
| 5,354,547 A | 10/1994 | Rao et al. | 423/650 |
| 5,377,491 A | 1/1995 | Schulte | 62/63 |
| 5,451,248 A * | 9/1995 | Sadkowski et al. | 95/99 |
| 5,529,607 A * | 6/1996 | Tan | 95/12 |
| 5,632,803 A * | 5/1997 | Stoner et al. | 95/53 |
| 6,517,791 B1 | 2/2003 | Jaynes | 423/210 |
| 2002/0125591 A1 | 9/2002 | Jaynes et al. | 264/12 |

FOREIGN PATENT DOCUMENTS

| | | |
|---|---|---|
| EP | 0601601 B2 | 12/1999 |
| EP | 0982273 A2 | 3/2000 |
| GB | 2227685 A | 8/1990 |
| JP | 0947624 | 2/1997 |
| WO | WO 03/11431 A1 | 2/2003 |

\* cited by examiner

Control Setpoint/Response Matrix

| Monitor Points | Control Setpoints ||||||  Control Action ||
| | Impurities || Product Purity || Pressure Level || | |
| | Lower Setpoint | Upper Setpoint | Lower Setpoint | Upper Setpoint | Lower Setpoint | Upper Setpoint | Reach Lower Setpoint | Reach Upper Setpoint |
|---|---|---|---|---|---|---|---|---|
| A | | | | | \multicolumn{2}{c}{Feedback loop (PID) constantly controls the inlet pressure at 14.5 psia} || Below setpoint PSA Feed Compressor capacity is decreased | Above setpoint PSA Feed Compressor capacity is increased |
| B | 1.0% | 2.5% | | | | | PSA waste stream directed to PSA Feed Compressor suction | PSA waste stream directed to Membrane Compressor suction |
| C | | | | | 165.0 psig | 175.0 psig | Membrane System processing maximum capacity | Membrane System processing minimum capacity |
| D | | | | | \multicolumn{2}{c}{Feedback loop (PID) constantly controls the Product pressure at 145.0 psia} || Below setpoint makeup Helium is added to system | Above setpoint makeup Helium is withheld from system |
| E | | | 98.5% | NA | | | PSA waste stream directed to Membrane Compressor suction | Once product stream is within specifications, PSA waste stream directed to PSA Feed Compressor suction |
| F | Current configuration utilizes a timer with a setpoint of 5.0 sec. [Alternatively could have an analyzer with setpoint of >2.0% total impurities] | | | | | | Direct "used" product stream to Helium Recycle Systems | Direct "used" product stream to Vent |

FIG. 4

CONTROL SYSTEM FOR HELIUM RECOVERY

CROSS REFERENCE TO RELATED APPLICATION

The present application is a 371 of PCT/US02/24136, filed Jul. 31, 2002, which application claims priority to U.S. provisional application Ser. No. 60/309,073, filed Jul. 31, 2001.

FIELD OF THE INVENTION

The invention relates to the recycle and purification of gas streams for industrial applications.

BACKGROUND OF THE INVENTION

Helium gas has the potential to be used in a wide range of manufacturing applications. Metal atomization processes, cold spray forming, cooling, and shield gas applications can all benefit in one way or another from the physical properties of helium (an inert gas with high thermal conductivity and high sonic velocity). The primary drawback, however, is its cost. Most of the aforementioned applications use large quantities of gas. The cost of using helium would be prohibitive without some form of recycle system for the used gas. Helium recycle systems, both with and without an integrated permeable membrane system, are well documented in the literature. These systems can be configured to reclaim and recycle in excess of 95% of the helium used by the process. For many applications this gives the customer greater flexibility in the amount of gas used. For some customers a higher flow rate of gas is preferred, but often not economically feasible due to the cost of gas product. Since the recovery for these systems is high, the associated costs for the helium are lower. Where higher flow rates would benefit the customer's process they now have the option to optimize their operation without the economic limitations present with other gases, or once-through helium systems.

The problem with many of these systems is that they have been designed to operate with a largely steady state system. For the most part the inlet impurity levels to the recycle system can be predicted and incorporated into the design. The customer's usage patterns are mainly steady state as well, with predictable usage rates.

However, when a customer has a transient usage pattern, coupled with varying levels of process impurities in the recycled stream, the system requires a complex control scheme to ensure that the system continues to operate optimally and achieve the high recovery levels needed to make the system economically feasible. Allowing the product supply to fluctuate with customer usage patterns allows for a tighter system design. Capital intensive pieces of the system such as the adsorption vessels, molecular sieve, valve and line sizes, and ballast and surge tank sizes can all be minimized by allowing the system to turn-down in times of low customer draw, and turn-up when demand is high. Moreover, the permeable membrane system can be operated in its most efficient region through the utilization of an intricate control routine. This allows for recoveries in excess of 95% over a broader range of operating parameters.

DISCUSSION OF PRIOR ART

Membrane integration with non-membrane separation techniques is well known in the prior art.

U.S. Pat. No. 4,238,204 outlines an improved selective adsorption process for the recovery of a light gas, such as hydrogen or helium, from a feed gas mixture by utilizing a membrane permeator unit selectively permeable to the light gas being collected. This patent does not address using the described invention in a transient application where feed stream composition and customer usage patterns vary with time.

U.S. Pat. No. 4,717,407 proposes an improved recovery system by integrating permeable membrane separation with "non-membrane" separation techniques. The patent refers to PSA applications as one of the possible "non-membrane" separation operations.

U.S. Pat. No. 5,004,482 utilizes a membrane separation unit on the product stream for a nitrogen or oxygen selective PSA system. The membrane unit serves as a gas dryer for the product stream in lieu of more expensive drying applications. The invention passes PSA waste gas, or alternatively a fraction of the product gas, through the permeate side of the membrane in a direction counter-current to the flow of the retentate stream to increase the efficiency of H2O transmission across the membrane boundary.

U.S. Pat. No. 5,207,806 discloses a method for co-product generation by integrating a PSA system with a membrane.

U.S. Pat. No. 5,354,547 discloses a process for recovery of hydrogen using a combination of a membrane and PSA systems from streams such as those generated by a steam-methane reformer.

U.S. Pat. No. 5,632,803 details a process for producing helium product stream at purities in excess of 98.0% from feed stock containing anywhere from 0.5 to 5.0% helium. The process utilizes a membrane separation unit with a high permeability for helium as a first stage separator. The helium enriched permeate stream is then forwarded to second and third stage PSA units for further refining. Waste gas from the second stage PSA unit can optionally be recycled back to the feed stream to the membrane unit, or to the inlet of the first stage PSA separation unit.

U.S. Pat. No. 5,077,029 utilizes a membrane/deoxo control system and process for the production of high purity nitrogen. Feed air is processed in a membrane (or alternately a PSA) separation unit. The crude nitrogen stream from this unit will contain approximately 1–3% oxygen. Hydrogen gas is introduced into this crude stream while on its way to the deoxo unit.

While PSA/Membrane integrated systems have been well documented in the literature for a multitude of gas separation applications, little has been published on the topic of control schemes that optimize system operation over a wide range of input and output parameters. Systems can be designed with enough excess capacity to meet any foreseeable demand on the system, and simply be operated in "turn-down" mode at times when the extra capacity is not needed. However, the excess capital required to build an oversized system makes this option less viable. The optimal efficiency of the system can only be realized if all components of the system are designed and operated at a specific point. On the other hand, integrated systems for the recycle of a spent gas stream from an application such as metal atomization or a plasma furnace generally have floating design points. This means that they must perform equally well over a wide range of supply volumes and recycled stream impurity levels. It is difficult to design a system that will run at a consistently high rate of recovery when the design conditions are in a constant state of flux. Hourly changes in the customer's helium consumption, and unique individual batch processes can both be expected to introduce widely differing amounts of stream impurities into the recycled helium stream. These variations can create off-spec product quickly if the system is not designed to handle them

OBJECTS OF THE INVENTION

It is therefore an object of the invention to provide a control system for a gas recycling system that recycles contaminated gas to an application such that recovery of such gas is greater than 55%, preferably greater than 95%. Where the gas is helium, the process and system of the invention is capable of purifying helium to a purity of 99.999 vol. % at the above recoveries.

SUMMARY OF THE INVENTION

The present invention relates to a system that reclaims helium gas from a customer's process, removes the process contaminants, and returns the reclaimed helium to the customers supply line at recoveries greater than 55%, preferably 95%. This provides a customer with greater flexibility in the usage rate of the helium gas, and dramatically reduces the otherwise prohibitively high cost of using helium for such a process.

In one embodiment of the invention, the gas recycling system comprises:
a) a source of gas having a predetermined purity of a desired component;
b) an application system that uses said gas and adds contaminants to said gas;
c) an adsorption system for removing said contaminants from said gas to produce a purified gas of said desired component, and a waste gas (containing the desired component), wherein said adsorption system includes an adsorbent bed, feed gas inlet, an product gas outlet for said purified gas and a waste gas outlet for said waste gas;
d) a gas purity analyzer adjacent to said waste gas outlet for measuring the amount of contaminants and/or the desired component in said waste gas;
e) gas conduits connecting the gas source to said application system, said application system to said adsorption system, said outlet to said application system and said second outlet to said feed gas inlet.

In another embodiment the system further comprises a membrane connected to the waste gas outlet of the adsorption system.

In another embodiment the feed inlet of the membrane is connected to the waste gas second outlet, such that said waste gas is passed through said membrane to produce a gas having reduced amounts of contaminants and a gas having a higher concentration of contaminants.

In another embodiment conduits for feeding said gas having reduced contaminants to the inlet to said adsorption system are provided.

In another embodiment the source of gas having a predetermined purity is connected to the conduits for feeding the gas having reduced contaminants (and the desired component) to the inlet to the adsorption system.

In another embodiment delivery pressure controls for controlling the feed pressure of gas to said application system are provided.

In another embodiment a second gas purity analyzer that measures the purity of said purified gas is provided.

In another embodiment controls that close the conduit connecting said adsorption system to said application system upon a signal from said second gas purity analyzer are provided.

In another embodiment a third gas purity analyzer that measures the purity of the contaminated gas from said application system is provided.

In another embodiment a conduit for venting the contaminated gas from said application system, wherein the venting conduit is opened upon receiving a signal from said third gas purity analyzer is provided.

The adsorption system can be a pressure swing adsorption system, a temperature swing adsorption system or a combination thereof.

In another embodiment, a process for purifying and recycling a gas is disclosed, said process comprising:
a) providing a source of gas having a predetermined purity of a desired component;
b) providing said gas to an application system that uses said gas and adds contaminants to said gas;
c) passing the contaminated gas to an adsorption system for removing said contaminants from said gas to produce a purified gas having the desired component, and a waste gas (having the desired component), wherein said adsorption system includes an adsorbent bed, feed gas inlet, an outlet for said purified gas and a second outlet for said waste gas;
d) measuring the amount of said contaminants in said waste gas;
e) venting said waste gas outside said system upon a signal from a gas purity analyzer.

In another embodiment the waste gas is passed through a membrane to produce a gas having reduced amounts of contaminants and a gas having a higher concentration of contaminants.

In another embodiment the process further comprises passing said gas having reduced contaminants to said adsorption system.

In another embodiment additional gas from said source of gas having a predetermined purity is added to said gas having reduced contaminants in order to compensate for the vented waste gas.

In another embodiment, the purity of said purified gas is monitored to ensure that it has substantially the same purity as said gas having a predetermined purity.

In another embodiment the contaminated gas from said application system, upon receiving a signal from a third gas purity analyzer adjacent to the outlet of said application system.

As used herein, the term "Application" means any industrial process using helium or other gas that is desired to be recycled. Such gases include, but are not limited to carbon dioxide, hydrogen, argon, neon, krypton, xenon, methane, as well as components of air such as oxygen and nitrogen. In general, the control methodology of the invention is applicable for any process of gas purification, reclamation/recycling that utilizes adsorption and/or membrane technology.

BRIEF DESCRIPTION OF THE DRAWING(S)

Other objects, features and advantages will occur to those skilled in the art from the following description of (a) preferred embodiment(s) and the accompanying drawing(s), in which.

DETAILED DESCRIPTION OF THE INVENTION

A limitation of existing recycling systems using PSA and selective membrane systems is that the performance of the membrane diminishes as the impurity level in the membrane feed stream decreases. As this impurity concentration falls more of the desired stream constituent (typically the membrane permeate) is vented as waste along with the retentate stream. This has a deleterious effect on overall system performance, as recovery for an integrated system suffers. However, this is a significant problem where high rates of recovery for a particular gas (e.g. helium) is desired.

The present invention obtains high, sustainable recovery of helium by always operating the membrane separation unit at an optimal point depending upon customer requirements and process conditions. This is achieved by continuously monitoring the oxygen concentration in the PSA waste gas stream.

When a PSA waste stream impurity concentration is below an optimal point (e.g. <2.5 mol % $O_2$), the entire waste stream is recycled back to the PSA feed compressor for further purification (less some minimum flow to the membrane at maximum turndown). During this time product gas (helium) recovery exceeds 95% (and approaches 100%) since the only product gas leaving the system is through leakage in the Application. Unfortunately, this recycle mode can not continue indefinitely without a resultant loss in product purity, as the accumulated contaminants must be removed from the PSA system so they do not break through the adsorbent beds into the product stream. Purging the contaminants from the adsorption system results in an associated loss of product, consequently reducing recovery.

In accordance with the invention, once the impurity level in the recycle loop builds to a pre-selected setpoint (which is a function of the optimal operating point for the membrane unit, and the designed-for load for the adsorbent beds), control logic signals the membrane unit to begin processing at maximum throughput.

A permeable gas selective membrane is capable of removing large quantities of the contaminants, while minimizing the amount of helium lost to vent during the process. The permeate stream (helium) may be recycled back to the feed compressor suction for further refinement, and the retentate stream, mainly oxygen and nitrogen with some small quantity of helium, is vented as waste. By following the process of the invention, more of the helium is retained in the system, increasing system recovery.

The membrane should be designed such that it is capable of removing impurities from the system faster than an application adds them. Therefore, even while a process continues to recycle gas back to the system for purification, the membrane is reducing the overall impurity level in the system. Once the PSA waste stream analyzer indicates that the impurity level has fallen to the low setpoint, the controls reduce the membrane throughput and most of the waste stream is once again recycled directly to the PSA feed compressor for feeding to the PSA.

While this control routine is monitoring the PSA waste stream, a separate analyzer is monitoring the PSA product stream for an off-spec condition. By "off-spec" we mean that the gas does not meet a customers required specifications.

In accordance with our invention, system controls are designed to protect the integrity of the customer process by initiating a response to such off-spec condition. Once product impurities exceed some upper setpoint, a signal from a product gas analyzer will supercede that of the PSA waste gas stream analyzer and initiate a response that sends maximum throughput to the membrane unit. This action significantly reduces feed stream impurities entering the PSA, thereby substantially reducing product stream impurities. Once the low setpoint for the product impurity level is reached, control of the membrane loop is once again returned to the PSA waste gas stream analyzer. Optionally, the system may continue to operate in the full membrane throughput configuration for some period of time to allow the PSA to "self-clean". If an off-spec condition has been detected, it can be assumed that the upper level of the adsorption bed has been contaminated. By continuing to operate the system with essentially pure helium it will effectively remove the contaminants on the upper reaches of the adsorbent bed as it goes through the cycle sequence. After some period of time system control may revert back to the PSA waste gas stream analyzer.

Figure 1:
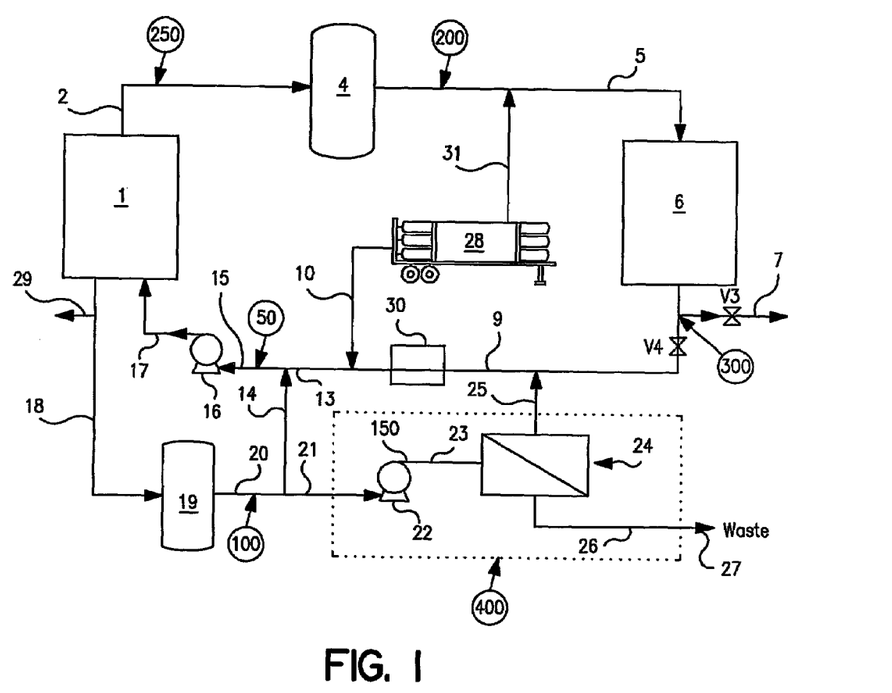
FIG. 1 is a process flow diagram of an embodiment of the invention utilizing a hydrogen removal unit, PSA system and membrane unit.
Figure 2:
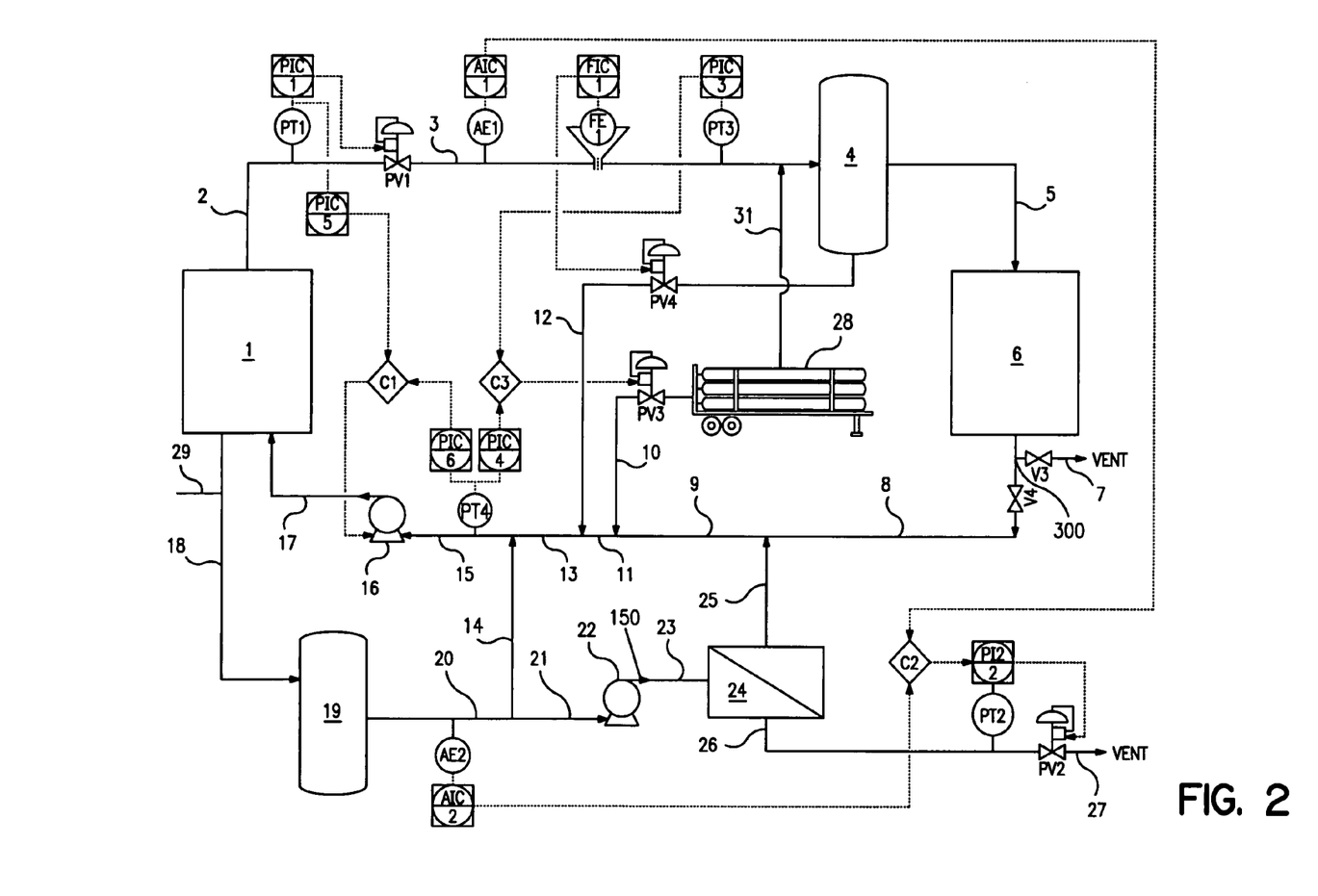
FIG. 2 process flow diagram showing a preferred embodiment of the invention

Thus, the present invention employs a complex control methodology that continuously monitors and adjusts system operation to closely match recovery system performance to the Application requirements. High recoveries for the combined system are achieved by monitoring and/or adjusting the following operating parameters Note that FIG. 1 is a simplified overview of the system of FIG. 2 described below. Common elements in FIGS. 1 and 2 are identified with common numbers.

A. With reference to FIG. 1, inlet pressure to the PSA feed compressor (16) as determined by pressure monitor (50). The Application product flow requirements are met by adjusting the PSA feed compressor capacity to meet the "used" gas flow recycled from the Application.

B. Oxygen concentration of the PSA waste stream as determined by gas analyzer (100). The system has been sized to handle some maximum level of impurity. The impurity level is allowed to build to this threshold before the membrane is employed to remove impurities from the system. The membrane (24) can therefor operate at an optimum rejection rate.

C. Membrane compressor throughput as measured by monitor (150). The membrane compressor (22) is called into service at precisely the time when the impurity levels of the recycled PSA waste stream match the optimum rejection rate for the membrane separation unit. The amount of PSA waste stream gas processed in the Membrane System (400) is controlled by modulating the capacity of the Membrane feed compressor (22). This is accomplished by either modulating the (back) pressure of the membrane retentate stream, or by directly modulating the membrane compressor throughput. Both have the same final effect.

D. Product delivery pressure to the Application as measured by monitor (200). Helium losses due to Application leakage and venting are corrected through the addition of make-up gas to the PSA feed compressor (16).

E. Oxygen concentration of the PSA/Membrane system delivered product as measured by gas analyzer (250). This is a safeguard to guarantee system integrity. Should the high setpoint be reached controls are activated to quickly bring the product back into spec.

F. Venting of some portion of the "used" gas stream via vent (7). Control over this parameter can be through either a preset timer, as in the case of the following discussion, or through online monitoring of the reclaimed stream via an analyzer (300).

Figure 3:
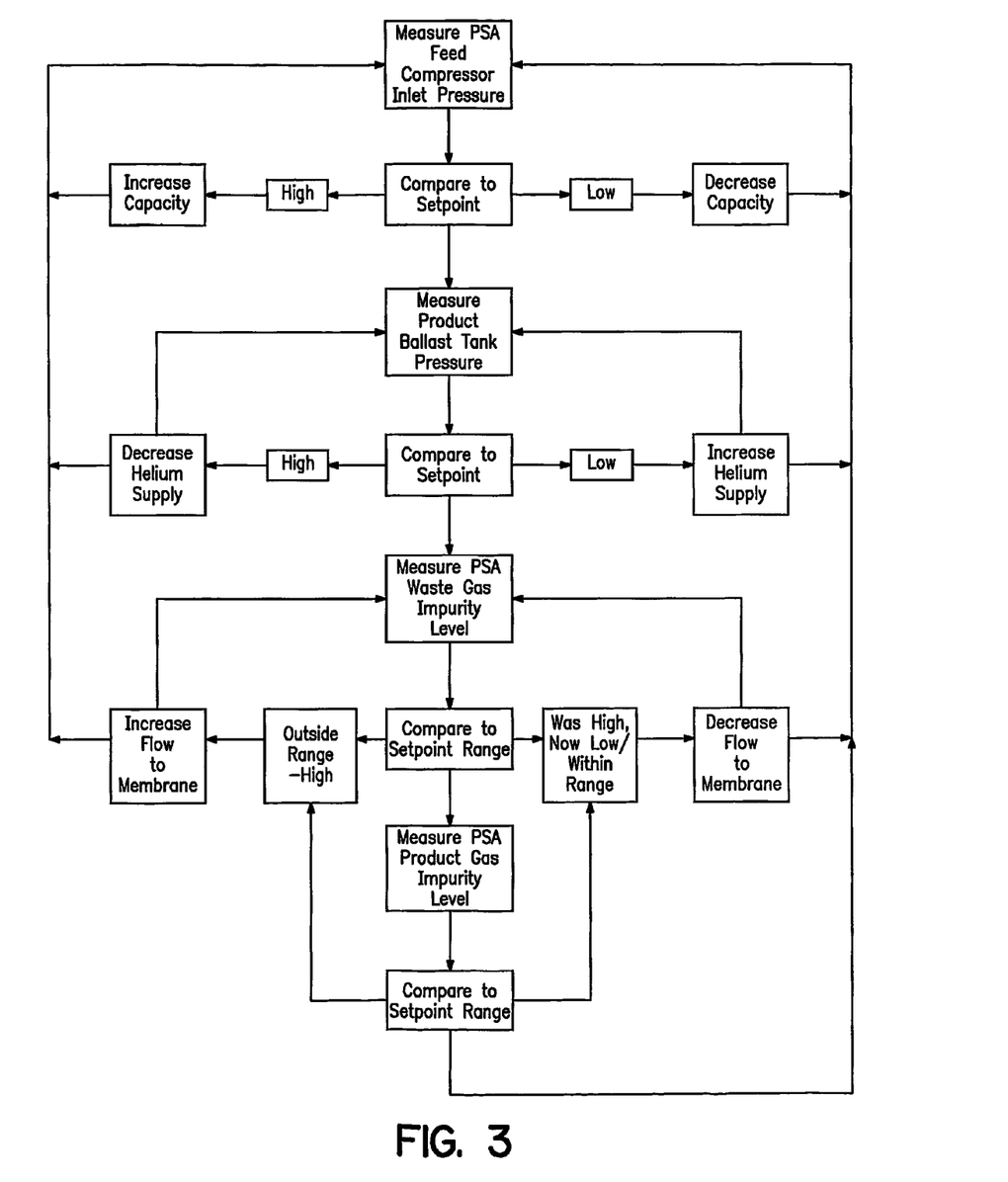
FIG. 3 is a logic flow diagram of a preferred embodiment of the invention.
Figure 4:
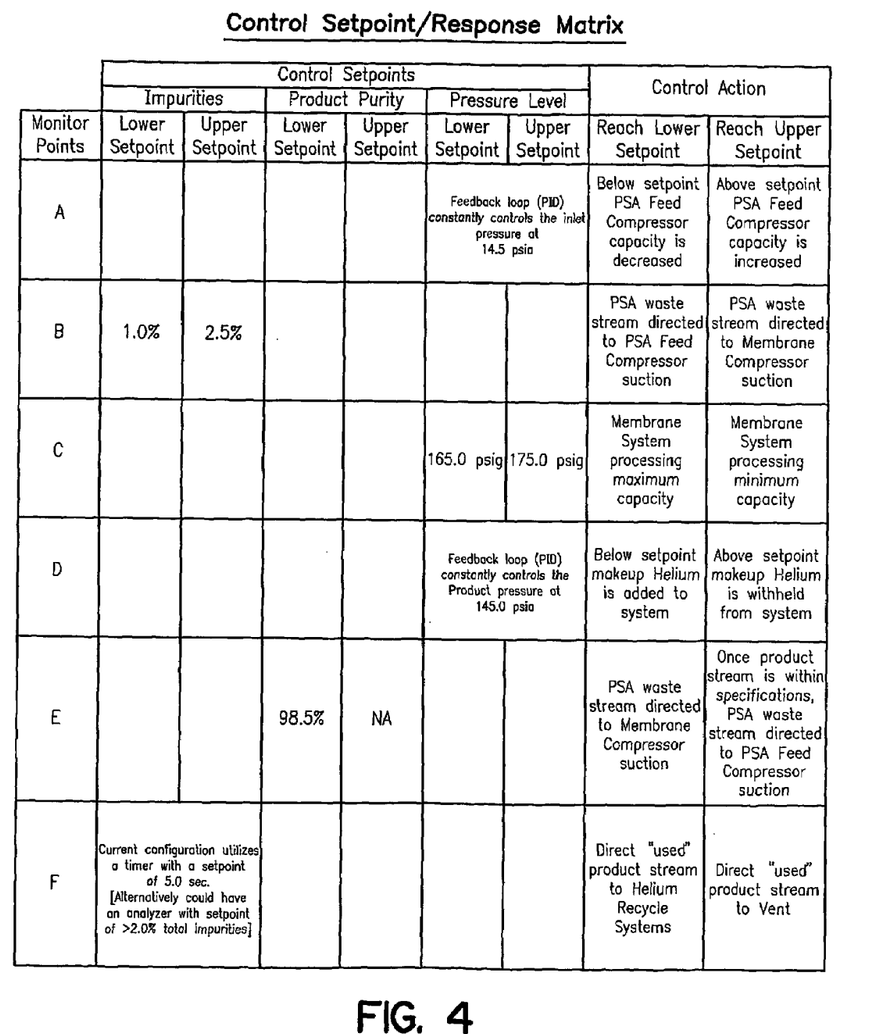
FIG. 4 is an example of a control setpoint/response matrix applicable to the invention.

The logic flow diagram provided in FIG. 3 gives a visual representation of how the above referenced control parameters are manipulated in the control scheme. FIG. 4 outlines a non-limiting example of setpoints and associated control responses. We note that these set points and control responses are dependent upon the process being controlled.

The following description of the control methodology integrates the operation of seven major pieces of equipment:

1. PSA Adsorption System
2. Membrane System (including feed compressor and separation membrane)
3. PSA Feed Compressor
4. Product Ballast Tank
5. Waste Surge Tank
6. Makeup Helium Supply
7. Application There are several modes of operation for the system, with five preferred distinct modes of possible operation for the combined system being specifically described below. The following letter designations A–F refer to separate control loops. In order of increasing complexity the five preferred modes of system operation are (with reference to FIG. 1):

1. A+B:

In the simplest mode of operation the system could be operated with a PSA feed compressor inlet pressure analyzer (50) control loop coupled with a PSA waste stream analyzer (100). When the impurity level of the PSA waste stream reaches a predetermined upper setpoint the stream could be switched to vent to atmosphere via vent (29). This would remove accumulated impurities from the system without the need for the Membrane System. In an operation using this embodiment, system recovery would be less than optimal.

2. A+B+C:

The next mode would then involve the use of the Membrane System, as represented by ("100"). This is the most basic system configuration that will result in high recovery levels greater than 90%. It involves passing the PSA waste stream through the Membrane System (400) rather than venting to remove accumulated impurities. In this mode there is a significant reduction in the amount of process gas (e.g. helium) that is lost while purging accumulated contaminants.

3. A+B+C+D:

For this configuration product delivery pressure controls are employed. The preceding configurations would operate at some fixed delivery pressure. By incorporating the product delivery pressure controls (200), a customer has the option of entering different Application gas pressure requirements. Should the need arise, this control method provides the option to deliver a higher-pressure gas supply to the Application.

4. A+B+C+D+E:

This mode of operation adds an analyzer (250) to the Recycle System product delivery line (2). It functions as a safeguard for the Application. Under this method of operation the Recycle System polices itself against off-spec product gas. In this way a high setpoint can be utilized as an alarm. This high setpoint is not required to be the maximum impurity level the Application could tolerate. Upon reaching this high setpoint the system may initiate a clean-up procedure that will bring the product back into spec without interrupting the product supply to the Application.

5. A+B+C+D+E+F:

This most preferred mode of operation includes all of the control features in order to create a Recycle System with maximum product recovery, flexibility, and ease of operation. In this embodiment some portion of the recycled gas stream from the Application may be vented via line (7) rather than recycled back to the recycle system. This venting serves two functions: First it allows for a means of purging low-grade gas from the system during start-up. This gas would contain impurity levels beyond the capability of the Recycle System. Second it allows the same system to be used over a wider range of Applications. If a particular Application has larger amounts of impurities in the recycled gas stream during certain portions of an operation, controls can be utilized on this vent line that would close valve (V4) Figure leading to the Recycle System, and open the valve to vent (V3 via line (7). After the bulk of the highly contaminated gas has been vented the valves can be switched back to resume the flow of "used" gas back to the Recycle System. This control methodology as discussed below utilizes timers that are pre-set during start-up operations. This is possible since it is readily known when the higher impurity gas will be leaving the Application. It is recognized that this system could alternately utilize an analyzer (200) on the reclaimed stream that could provide an additional control feedback loop to automatically vent highly impure gas when it is first detected. This would be useful for Applications with widely varying levels of impurities in the "used" gas stream that may be difficult to predict.

It is noted that other combinations of elements A–F are also possible. For example, any one or more of elements D–F may be added to combination A+B, without C. (e.g. A+B+D or A+B+D+F, etc.). Alternatively, any one or more of elements D–F may be used with C (e.g. A+B+C+F, or A+B+C+E, etc.)

The discussion that follows below is based on control methodology #5 above. It provides an overview of a preferred means of regulating a helium recovery system, as illustrated in FIG. 1.

With reference to FIG. 1, helium gas is supplied to an Application 6 from a product ballast tank 4 via conduit (5). Note that the original supply of gas (e.h. helium) is provided from supply (28) via conduit (31). The Application will introduce varying amounts of stream impurities into the helium. This contaminated helium is removed from the Application as a "used" gas stream. The used gas directed via conduits (8) and (9) through an optional hydrogen removal system (30), if necessary. In the optional hydrogen removal system (30), the feed gas is passed over a catalyst (e.g. a palladium monolith) in the presence of oxygen to make water. The gas is passed via line (13) to PSA feed compressor (16) and recycled to the recovery system for clean-up before being forwarded to the product ballast tank (4) for re-use. Some of the used gas reclaimed from the Application is too rich in impurities for the recycle system to handle, it must therefor be vented as waste via conduit (7) rather than recycled. The gas lost in this venting step is replaced with helium from supply (28) via conduit (10).

Periodically the PSA adsorbent beds will need to be regenerated. This regeneration process creates a helium-rich waste stream.

To effect greater recovery, the PSA waste stream is recycled via conduits (18) and optional surge tank 19, directly back to the PSA feed compressor (16) via lines (20, 14 and 15) when the impurity level is low. Recycling the PSA waste gas causes the impurity concentrations in this recycle stream to accumulate over successive cycles. At some point these impurities will reach a concentration that will exceed the capacity of the PSA adsorber vessels. A gas purity analyzer (100) monitors the waste stream for this upper limit. When this upper setpoint is reached the majority of the PSA waste gas stream is redirected via line (21) compressor (22) to the membrane (24). The membrane quickly removes and rejects PSA waste stream impurities via line (26), enriching the recycled waste stream (25) in the recycled gas (e.g. helium). When the analyzer (100) indicates that the lower impurity setpoint has been reached membrane compressor (22) capacity is reduced and the majority of the PSA waste gas stream is again directed via lines (20, 14 and 15) and other conduits to the suction side of the PSA feed compressor (16).

The system keeps pace with the Application demand by monitoring the PSA feed compressor suction pressure at with analyzer (100). High Application usage rates lead to higher amounts of used helium at the PSA compressor (22) inlet. This results in a higher inlet pressure. The higher inlet pressure will cause the compressor to increase capacity in an effort to reduce the inlet pressure. This generates additional helium for the Application. Falling suction pressure serves to decrease the compressor capacity, thus having the opposite effect on available helium product. If increasing the compressor throughput does not provide sufficient helium to maintain the ballast tank (4) delivery pressure setpoint measured by pressure monitor (200), the system will automatically add make-up gas from supply (28) via lines (10, 13 and 15) to the PSA feed compressor. The addition of gas will serve to increase the inlet pressure further, thus causing the compressor to increase its capacity further, making additional product available to the ballast tank (4). System integrity is ensured by monitoring the product purity through a gas purity analyzer (250). A detailed description of a preferred mode of operation follows. It is based on the design parameters listed below.

|  | Low Set | High Set |
|---|---|---|
| Application Product Requirement: | 550 scfm | NA | NA |
| PSA Adsorption Pressure Setpoint: | 170.0 psig | NA | NA |
| Membrane Back Pressure Range (psig): |  | 165.0 | 175.0 |
| Controlling Parameters: |  |  |  |
| PSA Feed Compressor Inlet Pressure: | 14.5 psia | NA | NA |
| Helium Application Supply Pressure: | 145.0 psig | NA | NA |
| Waste Impurity (Total %) Range: |  | 1.0 | 2.5 |
| Product Purity (% Helium) (200): | 99.999% | 98.5 | NA |
| "Used" Product Vent Time (300): | 5.0 sec | NA | NA |

We note that these design parameters would vary depending upon the gas being recycled and the process conditions.

The following detailed control process discussion makes reference to equipment and stream numbers as shown in FIG. 2. Common elements with FIG. 1 use the same reference numbers. We note that the term "AIC" means "analyzer indications controller"; the term "C" means Control Logic Loop (compare function); "FE" means "Flow Element" "FIC" means "Flow Indicating Controller"; "PIC" means "Pressure Indicating Controller"; "PT" means "Pressure Transmitter"; and "PV" means "Process Valve".

PSA unit (1) produces helium gas at 170.0 psig and purity in excess of 99.999%. Product flows to PV1 via conduit (2). Here PIC1 is maintaining the adsorption pressure setpoint through input from PT1 and modulation of PV1. PIC5 guards against system over-pressurization by monitoring PT1 for a high-pressure condition. If the high set is reached, the input from PIC5 supercedes PIC6 to C1 and the compressor capacity is turned back until the pressure as indicated at PT1 returns to the correct operating range. Analyzer (250) continuously monitors product purity. The control methodology will be discussed in more detail later. From PV1 product gas travels through flow element FE1 and is delivered to product ballast tank (4) via conduit (3). FIC1 reads the input from FE1 and modulates PV4 in times of need to ensure that some minimal amount of gas is always flowing through the system. This is done to ensure a fresh product sample at analyzer (250). When FE1 indicates that the minimum flow requirement is being met PV4 is closed and there is no product recycle.

PIC3 controls the product ballast tank (4) (ballast tank) pressure to a customer-defined setpoint through C3. PIC3 modulates PV3 to add helium make-up to the system as required. If the ballast tank pressure as indicated by pressure transmitter (200) falls below the setpoint gas is added to the system from supply (28) via conduit (10). The introduction of this gas to the compressor (16) inlet raises the inlet pressure. This action signals the compressor (16) to increase its throughput (capacity), thereby delivering additional product via line (2) to the ballast tank (4). Once the ballast tank pressure returns to the setpoint, the flow of make-up gas ends. This is all accomplished on a continuous basis through the use of a proportional-integral-derivative (PID) loop. Product gas exits the ballast tank (4) via conduit (5) and is delivered to the Application (6) where it is regulated down according to specific requirements. Gas that has been used by the Application ("used" gas) is now returned to the Recycle System via lines (8, 9, 13 and 15) to be purified and reused.

Certain processes within a given Application will introduce higher levels of impurities than will others. Valve V3 in line (7) may be used to purge such impure gas before it reaches the recovery system. This operation is controlled by preset timers and is based on Application process data. In an example the valve could remain open and vent "used" gas for a period of 5.0 seconds after an enabling button initiating the flow of product helium has been pressed in the Application.

Used gas to be recycled travels via conduits (8), (9), (11), (13), and (15) to the suction side of the PSA feed compressor (16). Along the way permeate (helium-rich) gas from the membrane unit enters via conduit (25), any make-up gas required is provided from supply (28) and enters via (10), and recycled PSA waste gas enters from (14). The compressor inlet must be maintained at low pressure to facilitate the recycle of helium from the Application. PT4 monitors the inlet pressure and maintains this condition through modulation of PSA feed compressor (16) capacity. PIC6 processes the signal from PT4 and increases or decreases the compressor throughput via C1. As discussed previously, a PSA overpressure condition is prevented through the input to C1 from PIC5. In the event of an overpressure condition this signal supercedes that of PIC6 and the compressor throughput is automatically decreased until the condition is corrected. The feed compressor (16) raises the reclaimed gas to the required adsorption pressure and transfers it to the PSA unit (1) via conduit (17). This "used" gas contains varying levels of impurities that must be removed by the PSA before being reused by the customer.

Upon completion of the adsorption step PSA unit (1) generates a waste stream containing concentrated levels of the feed gas contaminants. This waste stream travels via conduit (18) to a surge tank (19). Surge tank (19) mixes the waste stream to produce a more homogeneous impurity profile. The use of tank (19) also allows for providing continuous gas flow to the membrane (24). Conduit (20) typically contains a gas stream with impurity concentrations ranging from 1.0 to 2.5%.

Analyzer AE2 monitors this stream and compares the impurity level to set points in the control logic via AIC2. If the impurity level is less than 2.5%, for example, the majority of the waste stream is recycled directly back to the suction side of the PSA feed compressor (16) via conduit (14). A small percentage of the stream travels via conduit (21) to the membrane compressor (22). This minimal flow represents the full turndown throughput to the membrane compressor (22).

Whenever the system is in operation some nominal gas flow must be maintained through the compressor (22) to allow the membrane unit to remain on standby. At low impurity concentration levels the amount of helium expected to be lost to the retentate stream is nominal since the turndown throughput of the membrane compressor is approximately 20% of full capacity. The resultant helium-rich permeate stream (25) aids in system performance by diluting the contaminants in the waste stream.

As the PSA system (1) continuously recycles waste gas back to the PSA feed compressor (16), stream impurities accumulate. The impurity level will regularly reach the upper setpoint, at which point it becomes necessary to remove these accumulated impurities from the PSA system. Once analyzer (100) indicates that the PSA waste stream contaminants have reached or exceeded the high set point (e.g. 2.5%), AIC2 sends a new setpoint to PIC2 via C2. This set point will supercede all other inputs to C2 provided that the product purity as indicated by analyzer (250) meets required specifications. PIC2 now modulates PV2 to maintain the membrane system backpressure at the lower pressure, approximately 165.0 psig. At this setting the membrane compressor (22) is at maximum capacity. This capacity will account for the majority of the PSA waste stream from conduit (20), with the remaining gas continuing to recycle directly back to the feed compressor (16) via conduit (14). Although the membrane may not be capable of processing the entire PSA waste stream, it should be designed such that it will remove stream impurities in amounts greater than the rate at which the customer's process adds them. The membrane compressor (22) transfers gas at approximately 165.0 psig to the membrane unit (24) via conduit (23). The membrane (24) is preferably sized to reject oxygen and nitrogen in ratios approximately equal to that found in air. The total amount rejected is a function of the feed stream concentration. The retentate stream travels via conduit (26) to valve PV2. PV2 controls the membrane system backpressure providing the mechanism for modulating membrane throughput. The retentate stream vents to atmosphere via conduit (27).

The low pressure permeate stream, now enriched in helium, is recycled back to the PSA feed compressor (16) via conduits (25). This gas mixes with the reclaimed used gas in conduit (8) from the Application (6) before returning to the PSA compressor (16) via conduit (15). The impurity level in the PSA waste stream recycle loop (20) quickly falls through a dead band range to a low setpoint (e.g. 1.0%) as indicated by analyzer (100). At this point AIC2 resets the setpoint for PIC2 to 175.0 psig (full turndown). The majority of the waste stream in conduit (20) once again bypasses the membrane unit and recycles directly back to the PSA feed compressor (16) via conduit (14).

As discussed previously, the system is self-governing. Gas that is lost as retentate via conduit (27) through the membrane system creates a shortage of gas at the compressor (16). Other operations within the Application (6) are also "consuming" helium. Leakage from Application processes and venting of some of the higher impurity "waste" gas at V3 via conduit (7) are two such losses. The resultant gas shortage creates a low-pressure condition at the PSA feed compressor (16) inlet. This deficiency is indicated at pressure monitor (50), and PIC6 begins reducing PSA feed compressor capacity to bring the suction pressure back to setpoint. As long as the product ballast tank (4) is still operating at its setpoint pressure, 145.0 psig for example, the process controls assume the gas losses are not significant enough to warrant the addition of make-up gas from source (28). PIC6 simply maintains PSA feed compressor throughput at this lower capacity to maintain the suction setpoint. The amount of product being generated then also decreases. If the Application has a need for additional product, this will be signaled to the system through the ballast tank pressure as indicated by pressure monitor (200). Once the tank pressure falls below the setpoint, the need for makeup gas is recognized and PIC3 begins modulating PV3 to meet the demand. With the addition of this gas the PSA feed compressor inlet pressure) increases above is setpoint and PIC6 increases the compressor capacity to compensate. Additional product is made available to the Application. PIC3 continuously modulates PV3 to provide a continuous supply of product at the setpoint pressure.

The integrity of the system is maintained by continuously monitoring the purity of the product stream. Under normal operation the input from AIC2, and analyzer (100) which monitors the PSA waste stream in conduit (20) impurity level, should prevent an off-spec condition from occurring. However it is recognized that over an extended period of time events such as a creeping adsorption front in the adsorption beds, or an operator error leading to the introduction of impurities beyond the systems capability are possible. AIC1 compares the output from analyzer (250) to low and high setpoint values. When the stream is operating below the high setpoint, PV2 is allowed to operate in "normal" mode. The PSA waste stream impurity profile is governing the amount of PSA waste gas processed by the membrane. When an off-spec condition is detected by AIC1, for example the product purity level has fallen to 98.5% helium, AIC1 responds by superceding the input from AIC2 to C2. The setpoint for PIC2 is decreased by approximately 10.0 psig to 165.0 psig and the membrane unit begins processing maximum throughput. By processing PSA waste stream gas and passing more pure helium through the PSA system the impurity level in the product is quickly brought into check. Once analyzer (250) indicates that the impurities have reached or fallen below the low set point, control over the membrane unit reverts back to AIC2. The backpressure setting is changed back to 175.0 psig, and the unit is again operating in turndown mode.

This control methodology is not limited to the recycle of Helium gas. The methodology can be just as easily applied to recycling processes for Hydrogen, Oxygen, Nitrogen, Carbon Dioxide, or any other gas.

Other helium Applications that could benefit from a recycle system employing the control methodology as outlined here may include:

| Application | Minimum Recovery | Delivery Pressure (psig) | Flow Rate (scfm) | System Inlet Purity | Product Purity (% Helium) |
|---|---|---|---|---|---|
| Plasma Furnaces | 95.0% | 150 | 100–1000 | <100 ppm each $Co_2$, $O_2$, $N_2$, Co <1000 ppm $H_2O$ | 99.999 |
| Metal Atomization | 98.0% | 150–1200 | 200–5000 | <100 ppm each $O_2$, $N_2$ <1000 ppm $H_2O$ | 99.999 |
| Cold Spray Forming | 95.0% | 150–300 | 150–1500 | <100 ppm each $O_2$, $N_2$ <1000 ppm $H_2O$ | 99.0+ |
| Quenching | 97.0% | 150–600 | 50–500 | <5.0% each $CO_2$, CO, $CH_4$, $N_2$, $H_2$, $H_2O$ | Appx. 80.0 |

The PSA adsorption pressure high setpoint as indicated by PT1, and controlled through PIC5, can be any value and could be determined by one skilled in the art depending upon operations criteria.

Product delivery pressure as indicated by monitor (200) can be any value. This set point would be governed by a customer's specific requirements.

The product delivery pressure setpoint as indicated by monitor (200) could also be a floating point, or "dead-band" range of acceptable pressures. This may allow the system to run a more smoothly, preventing lag time issues between input and response that could cause the system to continuously over and/or under shoot the targeted operating point.

The PSA adsorption pressure setpoint as indicated by monitor (50) could be any value, and could be determined by one skilled in the art depending upon operations criteria.

The alarm high and low setpoints as indicated by gas analyzer (250) can be set to any value depending on a customer's specific requirements.

The amount of re-circulated product flow as indicated by FE1, and controlled by FIC1, can be any value, and could be determined by one skilled in the art depending upon operations criteria. This product re-circulation loop could be used to augment turndown capabilities for the recycle system by re-circulating significant quantities of helium product.

The operating pressure level to maintain at the PSA feed compressor inlet as indicated by monitor (50) can be any value, and could be determined by one skilled in the art depending upon operations criteria. Further, the low-pressure alarm as controlled by PIC4 can be any value, and could be determined by one skilled in the art depending upon operations criteria.

The timing of valve V3, which vents a certain amount of recycled process gas, can be either timer-controlled, or controlled from an analyzer input. As long as the recycled gas stream impurity exceeds some minimum allowable impurity level, the valve would remain open and "used" gas would vent.

The high and low impurity setpoints as indicated by AE2 can be any value and could be determined by one skilled in the art depending upon operations criteria, and are dependent on cycle times, adsorbent bed loading, and membrane unit design specifics.

Membrane turndown control as governed by PIC2 may utilize any differential pressure range to control the maximum and minimum throughput of the unit. This setpoint is dependent upon the process as well as the membrane design details, and could be determined by one skilled in the art depending upon operations criteria.

Backpressure on the permeate side of the of the membrane separation unit could be used to control the permeate purity.

The high alarm setpoint for the product purity is highly customer specific, and need not be the maximum impurity level the customer can tolerate. In this way the system can initiate a response to an off-spec condition without interrupting the customers supply of product. Should the preliminary measures fail to bring the product back on specification, a secondary high setpoint may be employed that would first alert the customer to the situation, then initiate a more dramatic response to the condition. The recycle gas from the customer's process could be vented through valve V3 via conduit (7). As a result monitor (50) would indicate a drop in feed compressor suction pressure and PIC6 would respond by decreasing the PSA feed compressor (16) throughput. The machine turndown would cause the ballast tank (4) pressure to fall, PT3 would recognize this as a product shortage, initiating a control response through PIC3 to open monitor (200) and let more make-up gas into the system. At this point all process gas is being supplied to the customer from the reserve tanks (28) via conduit (10). The customer would be alerted to this condition and be given the option to shut down the system or continue operation. The intent of the two-stage high alarm is to avoid an undesirable situation where the customer is rapidly depleting the helium reserve gas.

Additional controls could be employed that would track the number of times in a given time frame that the primary (first high alarm) response is initiated. Should the number exceed some maximum limit the system could initiate a clean-up routine that will force the unit to run with full membrane throughput for some predetermined period of time. During this time frame the PSA will be processing feed stock with very low impurity levels. This clean gas will serve to clean up the PSA adsorbent beds, removing the accumulated contaminants on the upper reaches of the adsorbent bed. After the clean-up routine has timed out control over the membrane would again revert back to AIC2.

To offer the greatest flexibility in the PSA/Membrane system design, the Membrane System (24) (see FIG. 1) could be operated in such a way that the system continuously operates in full capacity mode (i.e.: there is no turn-down control leading to increased membrane back-pressure or decreased membrane compressor throughput). In this way standard membrane systems could be used for increasingly larger PSA/Membrane Helium Recycle combined systems.

| Current Application | Total Impurities | Required Membrane Duty (Rejection Rate) |
|---|---|---|
| 850 scfm recycled He | 5.0% Air | 192.0 lb/hr |
| 1500 scfm recycled He | 5.0% Air | 338.0 lb/hr |
| 2000 scfm recycled He | 5.0% Air | 451.0 lb/hr |

As shown in the table, as the Application size grows the recycled helium stream also grows. The associated levels of impurities to be rejected also increase proportionally. To reject the increasing levels of impurities from the PSA waste stream requires that the membrane operate for longer periods of time in any given hour. The same size membrane can therefor be used in a combined PSA/Membrane recycle system up to the limitations of that particular membrane unit. For example, if the maximum rejection rate for the Membrane System being used for the example described above is 451.0 lb/hr, then it could be used for Applications using approximately 2000 scfm of helium and it would have to run continuously.

Alternative modes of operation for the combined PSA/Membrane System also include operating the Membrane System in some reduced throughput (turn-down) mode on a continuous basis (i.e. the throughput always remains constant during operation). This allows design flexibility to meet any specific Applications that might benefit from this mode of operation. Other adsorption or purification systems may be used instead of PSA such as thermal swing adsorption (TSA) systems, combination PSA/TSA systems membranes or the like. Adsorption processes include processes using one or more beds operating with subatmospheric (VSA), transatmospheric (VPSA) or superatmospheric (PSA) cycles.

The control method utilized in the most preferred example controls the membrane compressor throughput by modulating the membrane separation unit backpressure. The compressor is designed to provide gas to the membrane unit at a designed-for pressure. The compressor utilizes a pressure signal from its own discharge as a means of modulating its capacity. It automatically adjusts its throughput to maintain the setpoint discharge pressure. This discharge pressure control can be overridden by using a control valve on the membrane retentate stream. The compressor is designed to deliver gas to the membrane at 165.0 psia. By forcing the discharge pressure to 175.0 psig the compressor turns its capacity back as far as it is able to in an attempt to bring this pressure back to the 165.0 psig design point. It can not do so since the pressure is being controlled by means outside its control. The result is that as long as the compressor sees 175.0 psig at its discharge it will continue to operate in this turndown mode.

It is also possible to control the compressor throughput by sending a signal directly to the compressor slide valve in the same way that we are controlling the PSA feed compressor. Under this mode of operation a constant backpressure on the membrane unit can be maintained through some other means (PID loop with a control valve, backpressure regulator, or other), and the Membrane System throughput would be modulated by directly increasing or decreasing the capacity of the Membrane compressor.

The term "comprising" is used herein as meaning "including but not limited to", that is, as specifying the presence of stated features, integers, steps or components as referred to in the claims, but not precluding the presence or addition of one or more other features, integers, steps, components, or groups thereof.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A gas recycling system comprising:
   a) a source of gas having a predetermined purity (28);
   b) an application system (6) that uses said gas and adds contaminants to said gas;
   c) an adsorption system (1) for removing said contaminants from said gas to produce a purified gas and a waste gas;
   d) a gas purity analyzer (100) for measuring the amount of said contaminants in said waste gas;
   e) conduits (5), (8), (9), (13) and (15) connecting the gas source (4) to said application system and said application system (6) to said adsorption system;
   f) a membrane (24) connected to said adsorption system (1), such that said waste gas is passed through said membrane (24) to produce a gas having reduced amounts of contaminants and a gas having a higher concentration of contaminants; and
   g) conduits (25) for feeding said gas having reduced contaminants to said adsorption system (1).

2. The system of claim 1, wherein said source of gas having a predetermined purity (28) is connected to conduits (13) for feeding said gas having reduced contaminants to the inlet to said adsorption system.

3. The system of claim 2, further comprising delivery pressure controls (200) for controlling the feed pressure of gas to said application system.

4. The system of claim 1, further comprising delivery pressure controls (200) for controlling the feed pressure of gas to said application system (6).

5. A gas recycling system comprising:
   a) a source of gas having a predetermined purity (28);
   b) an application system (6) that uses said gas and adds contaminants to said gas;
   c) an adsorption system (1) for removing said contaminants from said gas to produce a purified gas and a waste gas;

d) a gas purity analyzer (100) for measuring the amount of said contaminants in said waste gas;
e) conduits (5), (8), (9), (13) and (15) connecting the gas source (4) to said application system, and said application system (6) to said adsorption system; and
f) a second gas purity analyzer (250) that measures the purity of said purified gas.

6. The system of claim 5, further comprising controls that close the conduits (2, 5) connecting said adsorption system to said application system upon a signal from said second gas purity analyzer (250).

7. A gas recycling system comprising:
a) a source of gas having a predetermined purity (28);
b) an application system (6) that uses said gas and adds contaminants to said gas;
c) an adsorption system (1) for removing said contaminants from said gas to produce a purified gas and a waste gas;
d) a gas purity analyzer (100) for measuring the amount of said contaminants in said waste gas;
e) conduits (5), (8), (9), (13) and (15) connecting the gas source (4) to said application system, and said application system (6) to said adsorption system; and
f) a third gas purity analyzer (300) that measures the purity of the contaminated gas from said application system (6).

8. The system of claim 7, further comprising a conduit (7) for venting the contaminated gas from said application system (6), wherein the venting conduit is opened upon receiving a signal from said third gas purity analyzer (300).

9. The system of claim 1, wherein said gas is helium.

10. The system of claim 1, wherein said adsorption system (1) is a pressure swing adsorption system, a temperature swing adsorption system or a combination thereof.

11. A process for purifying and recycling a gas, said process comprising:
a) providing a source of gas having a predetermined purity;
b) providing said gas to an application system that uses said gas and adds contaminants to said gas;
c) passing the contaminated gas to an adsorption system (1) for removing said contaminants from said gas to produce a purified gas, and a waste gas,
d) measuring the amount of said contaminants in said waste gas;
e) venting said waste gas outside said system upon a signal from a gas purity analyzer (100);
f) passing said waste gas through a membrane (24) to produce a gas having reduced amounts of contaminants and a gas having a higher concentration of contaminants; and
g) passing said gas having reduced contaminants to said adsorption system (1).

12. A process for purifying and recycling a gas, said process comprising:
a) providing a source of gas having a predetermined purity;
b) providing said gas to an application system that uses said gas and adds contaminants to said gas;
c) passing the contaminated gas to an adsorption system (1) for removing said contaminants from said gas to produce a purified gas and a waste gas;
d) measuring the amount of said contaminants in said waste gas;
e) venting said waste gas outside said system upon a signal from a gas purity analyzer (100); and
f) adding additional gas from said source of gas (28) having a predetermined purity to said gas having reduced contaminants in order to compensate for the vented waste gas.

13. The process of claim 11, further comprising using delivery pressure controls for controlling the feed pressure of gas to said application system (6).

14. The process of claim 11, further comprising measuring the purity of said purified gas to ensure that it has substantially the same purity as said gas having a predetermined purity.

15. The process of claim 14, further comprising the step of venting the contaminated gas from said application system (6), upon receiving a signal from a third gas purity analyzer.

16. The process of claim 11, wherein said gas is helium.

17. The process of claim 11, wherein said adsorption system is a pressure swing adsorption system, a temperature swing adsorption system or a combination thereof.

* * * * *